Jan. 12, 1960 W. C. TINUS 2,921,142

ELECTRICAL IMPULSE TRANSMITTER

Filed July 15, 1957 6 Sheets-Sheet 1

INVENTOR
W. C. TINUS
BY
[signature]
ATTORNEY

INVENTOR
W. C. TINUS
BY [signature]
ATTORNEY

Jan. 12, 1960 W. C. TINUS 2,921,142

ELECTRICAL IMPULSE TRANSMITTER

Filed July 15, 1957 6 Sheets-Sheet 3

INVENTOR
W. C. TINUS
BY [signature]
ATTORNEY

INVENTOR
W. C. TINUS
BY [signature]
ATTORNEY

Jan. 12, 1960 W. C. TINUS 2,921,142

ELECTRICAL IMPULSE TRANSMITTER

Filed July 15, 1957 6 Sheets-Sheet 5

INVENTOR
W. C. TINUS
BY [signature]
ATTORNEY

INVENTOR
W. C. TINUS
BY
[signature]
ATTORNEY 2,921,142
Patented Jan. 12, 1960

2,921,142

ELECTRICAL IMPULSE TRANSMITTER

William C. Tinus, Maplewood, N.J., assignor to Bell Telephone Laboratories, Incorporated, New York, N.Y., a corporation of New York Application July 15, 1957, Serial No. 671,981

7 Claims. (Cl. 179—90)

This invention relates to electrical impulse transmitting devices and more particularly to subscriber operated signaling devices for use in telephone systems to establish connections between subscriber stations.

An object of this invention is to provide means for transmitting coded signals for establishing a connection wherein the called subscriber's number is preset before the seizure of the line.

Another object of this invention is to provide means for displaying the identity of the called number so that the calling subscriber may observe the identity.

Another object of this invention is to provide an impulse transmitting mechanism which, after being preset will remain in the preset condition and will function repeatedly if the first attempt to obtain a desired connection is unsuccessful, for example, when a subscriber's line is busy.

A further object of this invention is to provide an impulse transmitting mechanism which will permit the signal transmitting means to automatically transmit different type codes, such as short codes for "Service" calls and long codes for "Local" and "Area" calls.

The invention contemplates the mounting of a plurality of strips side by side and capable of longitudinal movement to any desired set position. The strips have thereon visible indicia whereby a number selected may be displayed. Also, the strips have thereon coded magnetic markings corresponding to the indicia and arranged to be aligned in a transducer path so that when the selected number is completely set it may be verified by the display of the indicia, whereupon the device may be triggered for operation, such operation causing a transducer to sweep transversely over strips along a predetermined path and translate the magnetic codes on the strips into a train of electrical impulses corresponding to the indicia displayed. These impulses are then amplified, and subsequently sent over the line to actuate central office equipment.

The call is then completed between parties in the usual manner.

The invention and the several features thereof will be understood from the following detailed description when read in connection with the accompanying drawings, in which.

Figure 2:
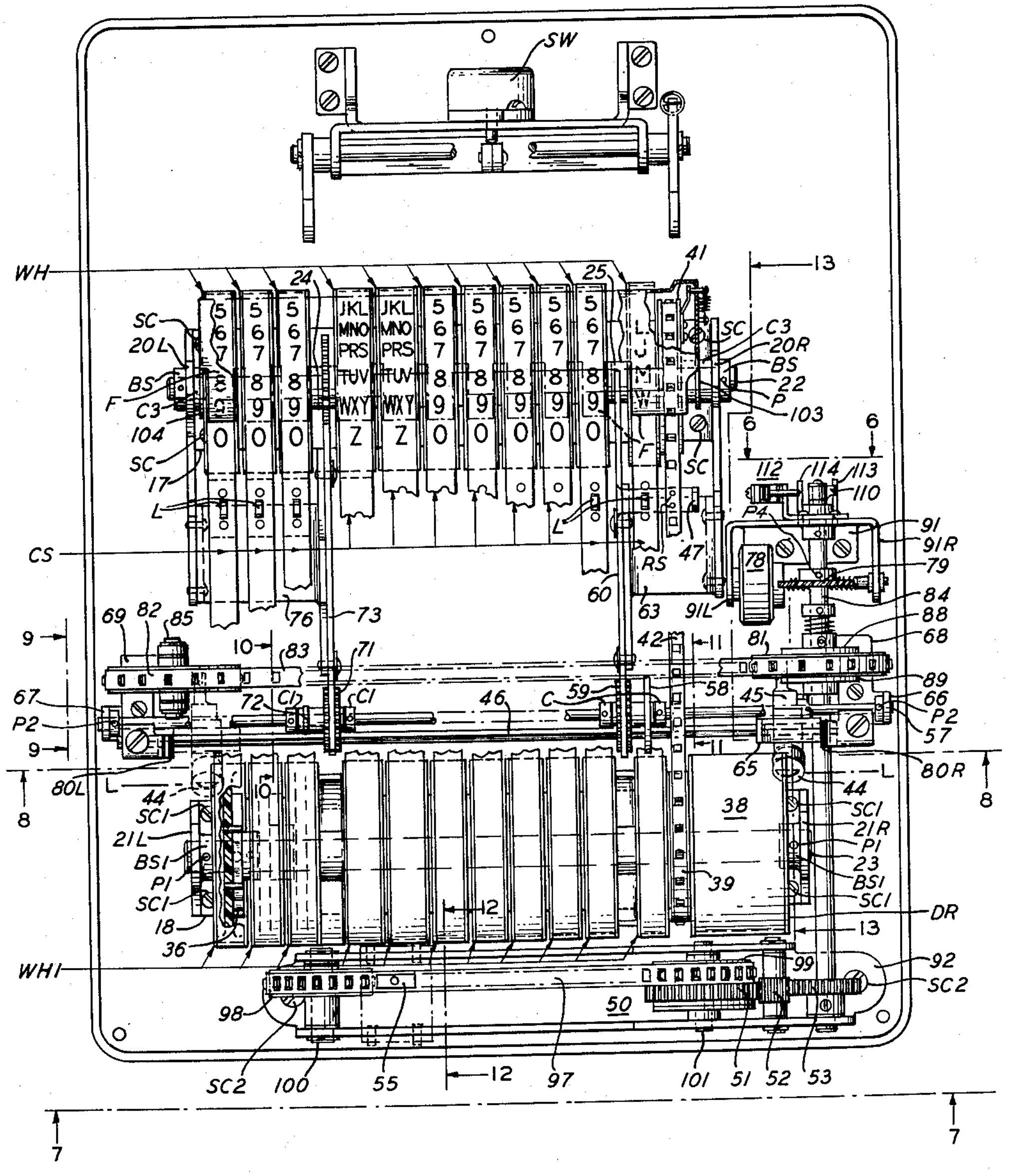
Fig. 2 is a plan view of the device with the housing removed, and parts broken away to show the interior.
Figures 3, 4, 4A, 5, 6:
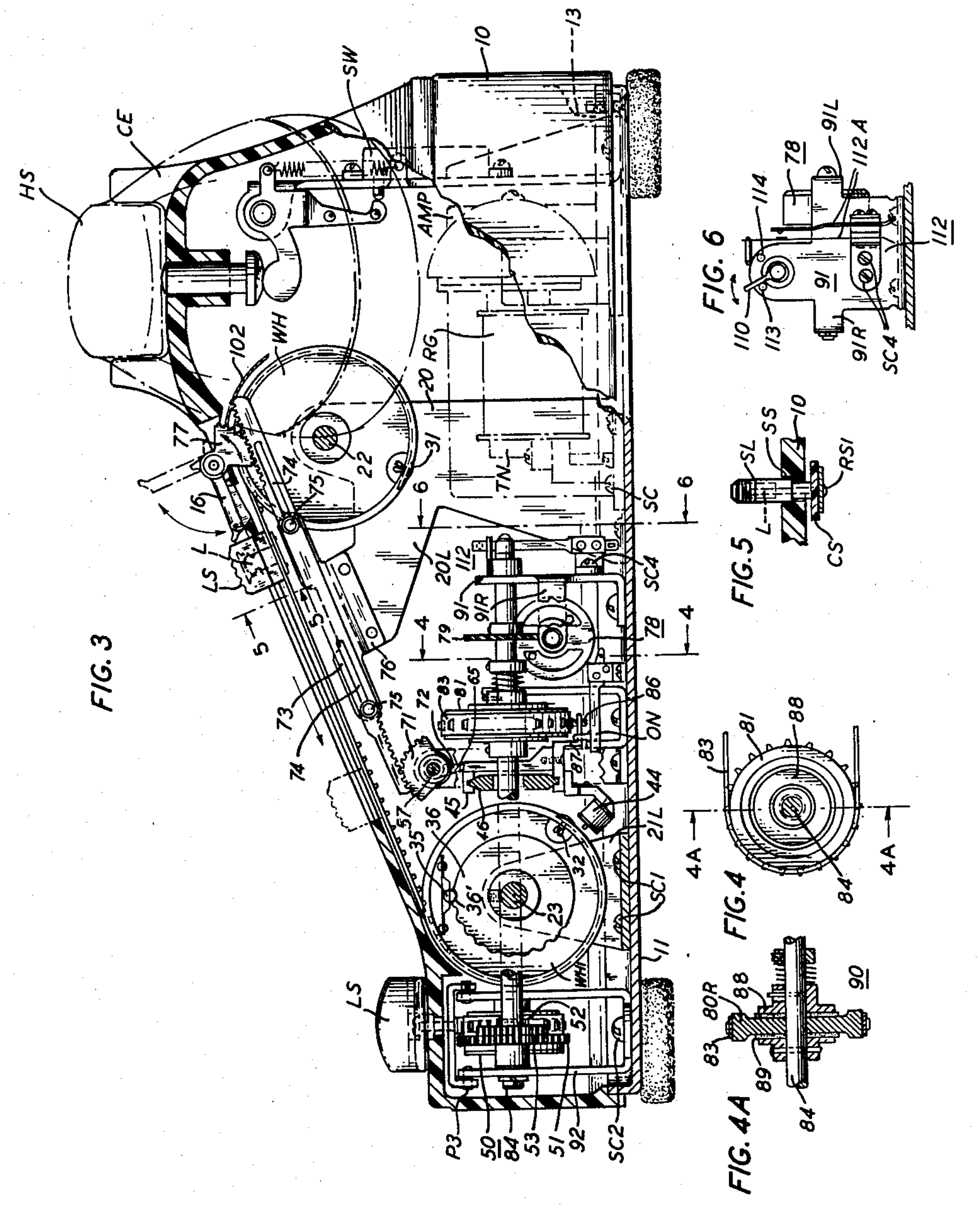
Fig. 3 is a right side elevation of the device with the housing and parts broken away to show the interior structure.
Fig. 4 is a fragmentary view taken on line 4—4 of Fig. 3 showing the clutch assembly and driving wheel.
Fig. 4A is a cross-sectional view taken on line 4A—4A of Fig. 4.
Fig. 5 is a fragmentary cross-sectional view taken on line 5—5 of Fig. 3 illustrating the means for fastening the slider fingerpiece to the film strip.
Fig. 6 is a view taken on line 6—6 of Fig. 3 illustrating the switch contacts for the transducer circuit.
Figures 9, 10, 11, 12:
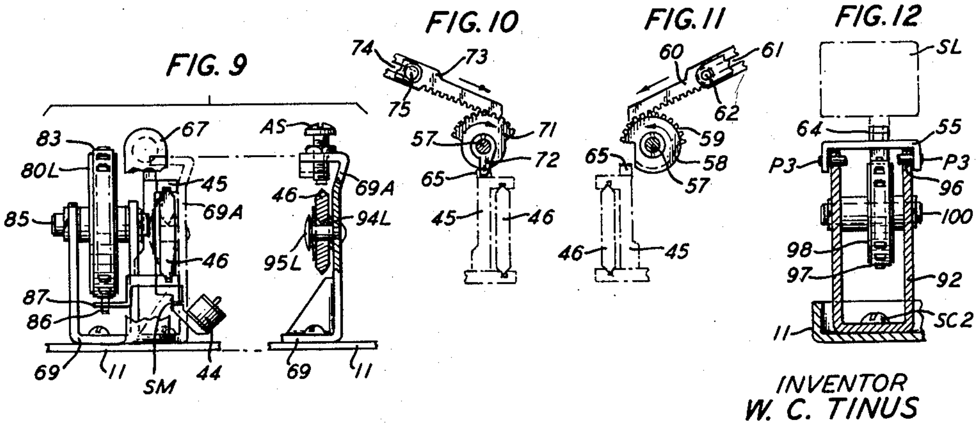
Fig. 9 is a side elevational view taken on line 9—9 of Fig. 2 and shown partially exploded to illustrate the mounting means of the guide bar and the idle drive wheel.
Figure 13:
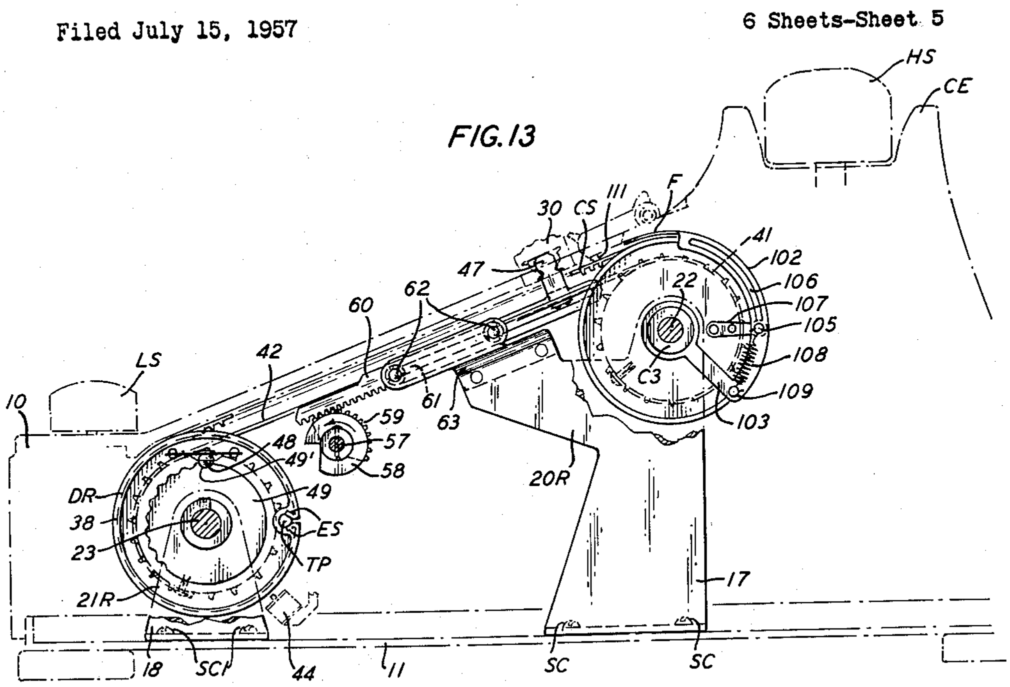
Figure 15:
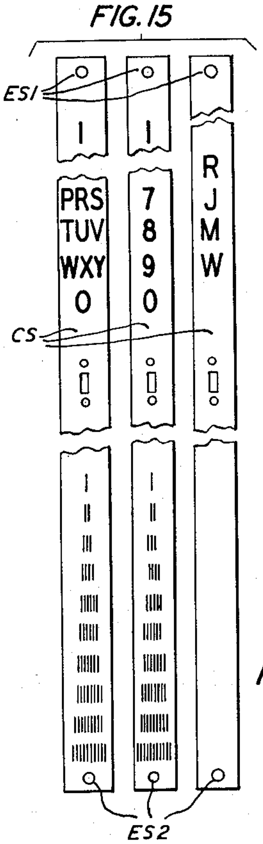
Figures 14, 16:
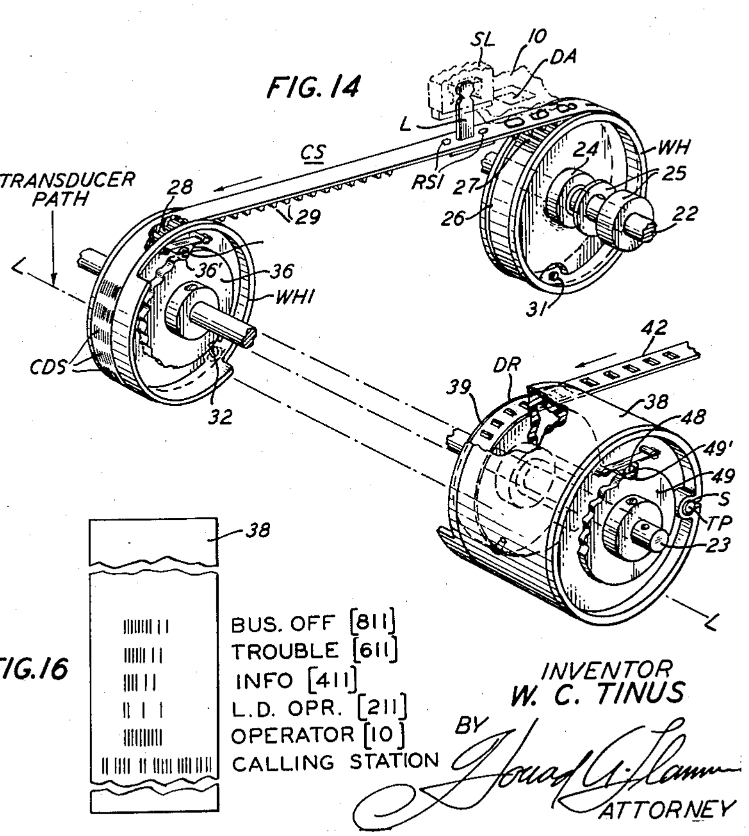
Figure 17:
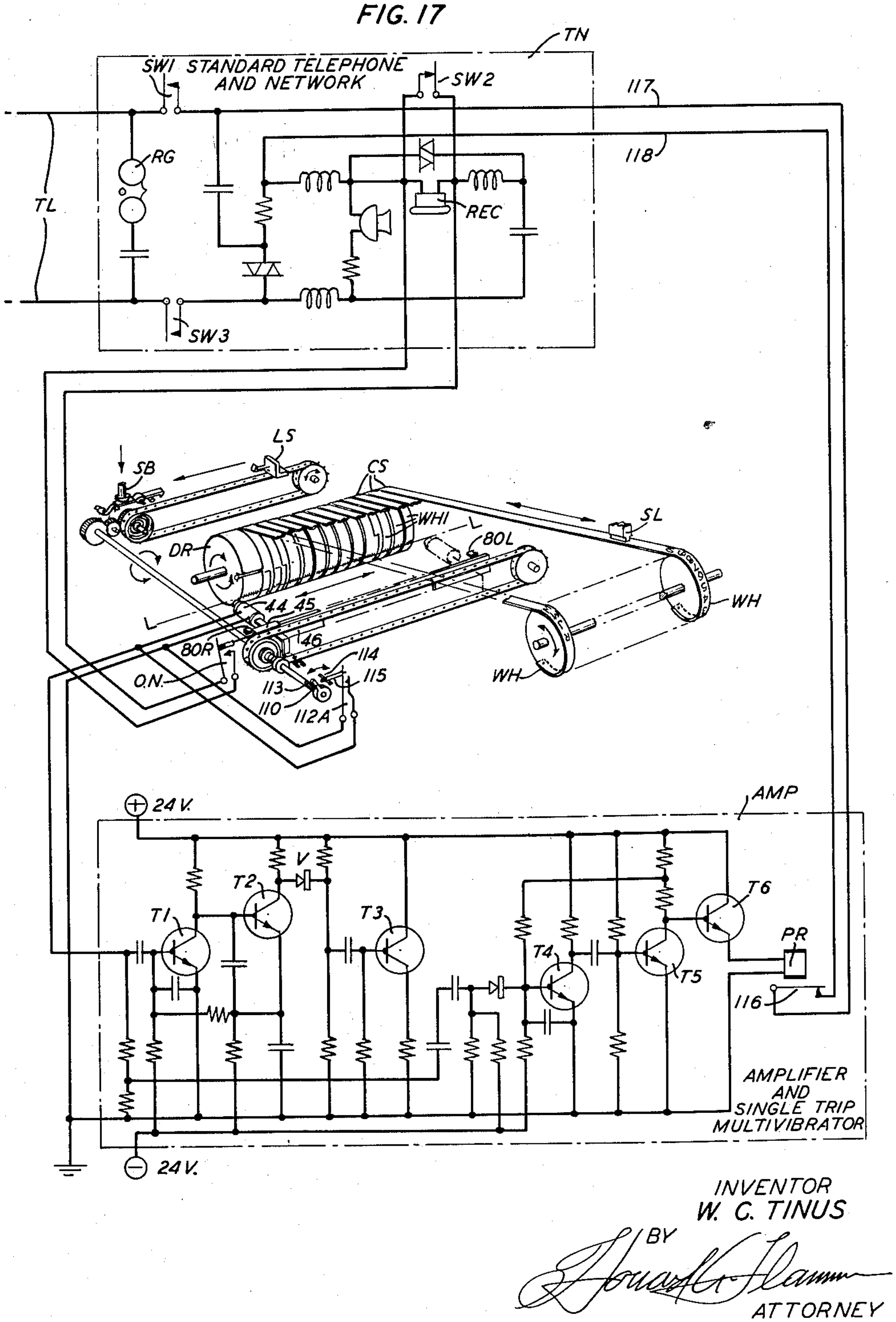

Figs. 10 and 11 are fragmentary views taken on lines 10—10 and 11—11, respectively, of Fig. 2, illustrating the carriage stop mechanisms;

Fig. 12 is a fragmentary side elevational view taken on line 12—12 of Fig. 2, partially shown in section, of the motor lever mechanism;

Fig. 13 is a side elevational view, similar to Fig. 3 taken on line 13—13 of Fig. 2 with parts broken away to illustrate the shutter and closure mechanism;

Fig. 14 is a fragmentary perspective view illustrating the film strip, mounting wheels and detent mechanism;

Fig. 15 is a plan view of the various strips used showing pictorially the digitally characterized magnetic patterns impressed thereon;

Fig. 16 is a plan view of the strip used for transmitting the calling station's identification code and service calls, showing pictorially the digitally characterized magnetic patterns impressed thereon, and with the corresponding indicia shown on the drawing for identification only; and Fig. 17 is a schematic wiring diagram disclosing the circuit arrangement for the device of this invention.

The electrical impulse transmitting device of this invention, shown in the various figures is preferably housed in a casing 10, which is secured to base 11 by means of screws which engage the bosses 13 located in the front and rear ends of the casing 10. A handset HS, shown in dot and dash outline with its cord CD connected thereto, is positioned in the cradle CE in the usual manner, the weight of the handset HS being adapted to open and close a switch, which serves to condition the device for operation.

Figure 1:
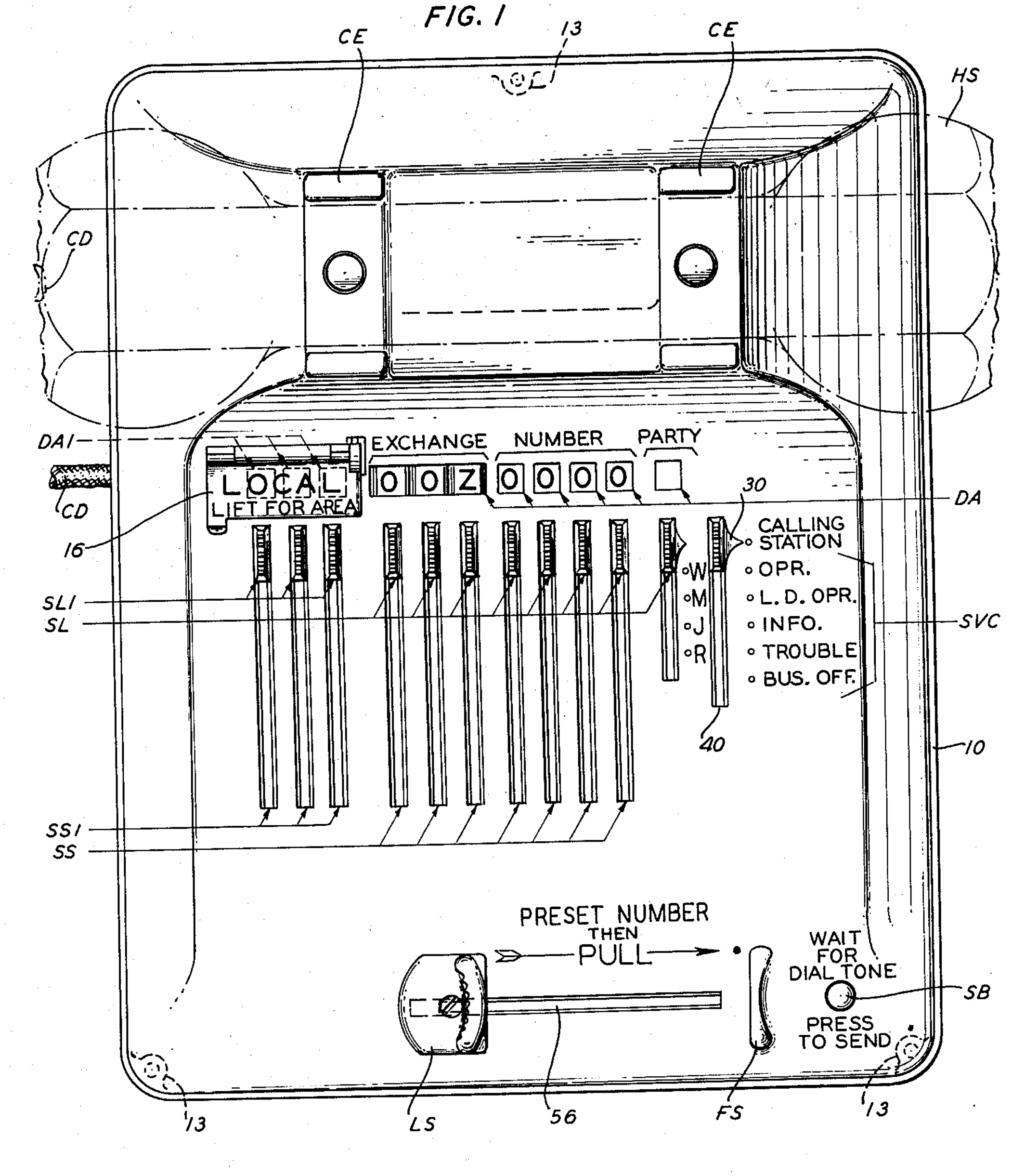
Fig. 1 is a plan view of the device of my invention with the handset thereon shown in dot and dash outline.

As shown in Fig. 1 the means for presetting a desired "Area" or "Local" code comprises a plurality of sliders SL—SL1, which are secured to the code strips CS and which when actuated in the slots SS—SS1 serve to position the code strips CS and 38, thus providing the display of their indicia in the apertures DA—DA1, and the consequent alignment of their corresponding magnetic codes in the transducer path.

A door 16 as shown in Figs. 1 and 3 is hinged to the casing 10, which may be raised to an upright position for conditioning the mechanism so that the area code of a "National" call can be read, and the area indicia displayed in the apertures DA1.

The lever slider LS and the sending button SB, when operated in proper sequence, and in combination with the aforementioned members, will perform the functions pertinent to the operation of this device, for sending a selected call, as described later herein.

In Fig. 2, the bracket 17 is shown secured to the base 11, by screws SC, and provided with the bent arms 20R and 20L, which are fitted with bosses BS in their ends for supporting the shaft 22, which in turn is suitably fixed to the bosses BS by the pins P. Also shown in Fig. 2 is the bracket 18 secured to the base 11 by screws SC1, and provided with the bent arms 21R and 21L, which are fitted with bosses BS1 in their ends for supporting the shaft 23, which in turn is suitably fixed to the bosses BS1 by the pins P1.

Provided as the means for selecting codes with the device of this invention are the code strips CS, which are attached to the plastic wheels WH and WH1 rotatably mounted on their respective shafts 22 and 23, shown in Figs. 2 and 14.

The code strips CS as shown in Fig. 15 are formed from flexible insulating material, such as plastic or the like, each strip having its upper section marked with pre-assigned indicia comprising letters or numerals which correspond to respective digitally characterized magnetic codes, which are deposited or impressed on the lower section of each of said strips by means commonly known, the said codes being also spaced in relation to the preassigned indicia; each of the said strips being provided with holes located at their ends ES1 and ES2 for facilitating their attachment to the aforementioned wheels WH and WH1.

The wheels WH are suitably positioned on shaft 22, by means of their hubs 24 and the washers 25; and the wheels WH1 are positioned similarly on shaft 23, by means of their associated detent gears 36. Both means, as described above, serve to align the wheels WH and WH1, and, their attached code strips CS, with respect to the longitudinal slots SS–SS1 and the apertures DA—DA, shown in Fig. 1.

Affixed to the code strips CS are the levers L as shown in Fig. 14, with attached sliders SL, for moving the code strips CS when selecting a call.

The code strips CS are fastened to and easily detached from the wheels WH and WH1 for facilitating their replacement, by means of the removable fasteners 31 and 32, located in their ends ES1 and ES2, and are also rotatable with the wheels WH and WH1 by means of their rack teeth 29 in engagement with the teeth 27 and 28, which are formed within the grooves 26 and 26' of the wheels WH and WH1, respectively; thus the code strips CS when moved by the sliders SL and SL1 will position indicia in the apertures DA—DA1 and align the appropriate magnetic codes CDS in the transducer path L—L, as shown in Fig. 14.

In order that the indicia and magnetic codes on code strips CS will be positioned as described above, the wheels WH and WH1 are adapted for rotating in definite increments, by the detent means shown in Fig. 14, consisting of the spring biased ball 35, supported on wheel WH1, and in detent with the teeth 36' of the gear 36 fixed to shaft 23.

Associated with the code strips CS for providing the identification code of the calling subscriber and also the codes of several telephone service calls in the code strip 38, attached to the plastic drum DR rotatably mounted on the shaft 23, as shown in Figs. 2 and 14.

The code strip 38 is suitably attached to drum DR for easy replacement, by means of a removable pin TP, securing the ends ES of the strip 38 within a socket hole SH, located in the edge of the drum DR, thereby adapting the code strip 38 so it can be replaced when changes in code are necessary.

Integrally formed with drum DR is the sprocket 39, suitably engaged to the sprocket wheel 41 on the shaft 22 by the sprocket belt 42, for driving the drum DR as shown in Figs. 2 and 14.

Affixed to the belt 42, by rivets RS, is the lever 47, integrally formed with the gear rack 60, which is adapted with the slot 61 slidably mounted on the fixed pins 62 of bracket 63, so that it can be moved longitudinally for the purpose described herein later in the specification.

The action of lever 47, when moved for the selection of any "Service" call designated on the casing 10, shown in Fig. 1, will perform several functions simultaneously, each being described herein in its functional order.

Moving the lever 47, by its attached slider 30, from the "Calling Station" position to any of the "Service" call groups, identified as SVC on Fig. 1, causes the rotation of the drum DR by the means described heretofore, and positions the appropriate magnetic code of the selected call in alignment with the transducer path L—L, shown in Fig. 14. Consequently, the translation of the "Calling Station" code, which normally is sent for identifying the calling subscriber, is prevented since such identification is pertinent only to "Local" or "Area" calls.

In order to facilitate the selection of the particular service call and also to maintain its appropriate magnetic code in alignment with the transducer path L—L, the drum DR is provided to be positioned in definite increments by the detent means shown in Figs. 13 and 14, consisting of the spring biased ball 48, supported on the drum DR and in detent with the teeth 49' of the gear 49 which is fixed to the shaft 23.

An addtional function is performed with the action of lever 47, which positions a shutter member 102 so that the indicia displayed in the apertures DA—DA1, as shown in Fig. 1 are obscured, when a "Service" call is selected.

The shutter member 102 is shown in Figs. 2 and 13 adapted with serrated fingers F, which are spaced on its upper edge with respect to the position of the code strips CS on wheels WH and WH1, and are also formed in an arc concentric with the shaft 22 for facilitating their purpose, as described later in this description.

The shutter 102 is suitably mounted rotatably on shaft 22 by its bent arms 103 and 104, and is also provided with a slot 106 on its right bent edge, for engaging a pin 105 affixed to the arm 107, which in turn is secured to the sprocket wheel 41. The pin 105 is also held biased in the slot 106 by its attached spring 108, which is also fastened to the arm 103, by the pin 109, for holding the shutter member 102 in a fixed relation with respect to the sprocket wheel 41. Thus the shutter 102 is adapted to rotate with the sprocket wheel 41, when the lever 47 is actuated for selecting a "Service" call, thereby causing the serrated fingers F to be suitably positioned by the stop 111, located on casing 10, and consequently prevents the display of the indicia in apertures DA—DA1, as shown in Fig. 13.

Another function performed concurrent with the action of lever 47 positions means for limiting the travel of the transducer carriage 45 on guide bar 46. These means consist of the gear rack 60, shown in Figs. 2, 8, 11 and 13 engaged with the gear sector 59, which is adapted integral with a segmented disc 58 mounted rotatable between the collars C on shaft 57, which in turn is fixedly mounted by the pins P2 in the journaled arms 66 and 67 of the brackets 68 and 69, secured to base 11.

Thus the gear rack 60 when moved by the lever 47 causes the segmented disc 58 to be rotated on shaft 57 with its unsegmented portion 59 suitably positioned for contacting the extended ear member 65 of the transducer carriage 45, when it is driven transversely leftward on guide bar 46, thereby positioning the transducer 44, which is attached to the carriage 45, so that it will read only the code of a selected "Service" call when the carriage 45 is released and driven transversely rightward on guide bar 46.

A similar means as described above is shown in Figs. 2, 3, 8, and 10, for sending only the code of a selected "Local" call. This means comprises the integral finger 72 of the gear sector 71 which is rotatably mounted between the fixed collars C1 on shaft 57, and held in its normal position by the engagement of gear sector 71 with the gear rack 73, as shown in Fig. 10, thus suitably positioning the finger member 72 on the shaft 57, for contacting the extended ear member 65 of the transducer carriage 45, when it is driven transversely leftward on guide bar 46, thereby positioning the transducer 44 so that it will read only the code of the selected "Local" call when its carriage 45 is driven transversely rightward on guide bar 46.

A means to permit the reading of the combined area and local code of a "National" call is shown in Figs. 2 and 3 and comprises of the gear sector 77 which is affixed to the hinged door 16, and engaged with the gear rack 73 which is slidably mounted to the bracket 76 by the pins 75 in its slots 74.

Figure 8:
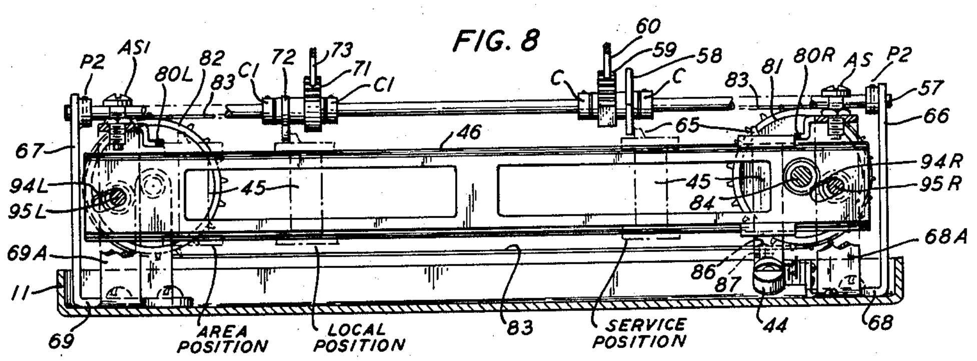
Fig. 8 is a front elevational view taken on line 8—8 of Fig. 2 illustrating the transducer carriage, guide bar and carriage stops.

Thus by the means as described above, the gear rack 60 is adapted to be moved longitudinally, when the hinged door 16 is lifted to an upright position on casing 10 thereby causing the gear section 71 to be rotated, so that its integral finger member 72 is suitably positioned on the shaft 57, for permitting the complete travel leftward of the carriage 45 on guide bar 46, to the stop 80L, shown in Fig. 8. Thus the combined code of a "National" call will be read when the transducer carriage 45 is released and driven transversely leftward on guide bar 46 to its normal position provided by the stop 80R.

Suitable means are shown in Figs. 2 and 8 for moving the transducer carriage 45 transversely on guide bar 46, which comprises a belt 83, in engagement with the sprocket wheels 81 and 82. The sprocket wheels 81 and 82 are rotatably mounted on their respective shafts 84 and 85, which are supported by the brackets 91, 92 and 69.

The sprocket wheel 81 is provided frictionally engaged to shaft 84 by means of the fixed plate 89 and the spring loaded plate 88, of the clutch 90. Thus the rotation of shaft 84 in either a clockwise or counterclockwise direction will cause the belt 82 to be driven accordingly, for moving the transducer carriage 45 transversely on guide bar 46.

The transducer carriage 45, as shown in Fig. 9, is provided with a bifurcated arm 87 in engagement with the pin 86, fixed in the lower end of the belt 82, such means serving as a suitable connection for the transducer carriage 45, and also the means for permitting the guide bar 46, and the carriage 45 mounted thereon to be moved vertically for spacing the transducer 44 in juxtaposition with respect to the code strips CS and 38.

The guide bar 46 and the transducer 44 are constructed from a light non-magnetic metal, such as Duralumin or magnesium to facilitate their vertical movement thereof by the means shown in Figs. 8 and 9.

The means referred to above consist of angular slots 94R and 94L located in the ends of the guide bar 46, which cooperate with the guide pins 95R and 95L suitably mounted on the brackets 69 and 70, respectively, to move the guide bar 46 vertically, when the carriage 45 thereon is released and driven transversely to the right by the operation of the sending button SB. Thus the transducer 44 on the carriage 45 is raised for reading the magnetic code on the code strips CS and 38.

In order that the transducer 44 is suitably positioned for reading the magnetic code by the means described above, the vertical movement of the guide bar 46 is limited by the screws AS and AS1, mounted adjustably in the arms 68A and 69A of the brackets 63 and 69, respectively.

The transducer 44 is flexibly mounted on the transducer carriage 45 by means of the flat spring member SM to bring the transducer 44 into intimate relationship with the code strips CS and 38 during the effective operating movement thereof whereby any wear of the code strips due to actual contact between the transducer and the said code strips is limited to such operating stroke.

Figure 7:
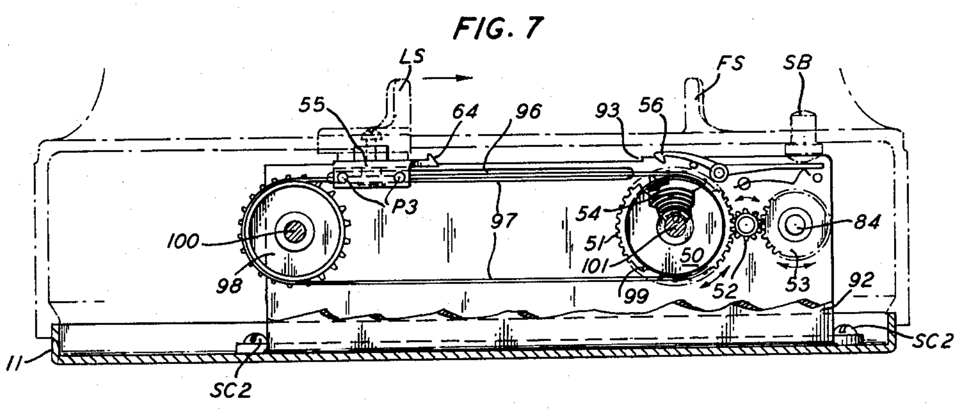
Fig. 7 is a front elevational view taken on line 7—7 of Fig. 2 illustrating the actuating lever, motor and release mechanism.

The aforementioned travel to the left of the transducer carriage 45 on guide bar 46 is provided by the driving means supported on the U-formed bracket 92, secured to the front end of base 11, by screws SC2, as shown in Figs. 2, 3 and 7. It consists of the lever slider LS, secured to the carriage 55, slidably mounted in the slots 96 by the pins P3, and attached to the sprocket belt 97, which is engaged with sprocket wheels 98 and 99 rotatably mounted on the shafts 100 and 101, respectively, all of which serve as means for rotating the engaged integral gear member 51 of sprocket 99, with the pinion 52 in mesh with gear 53, when the lever slider LS is pulled to the right to the stop 93, consequently causing the shaft 84 to be rotated counterclockwise, and the carriage 55 suitably latched by its extended toothed member 64 in engagement with the pawl 56, shown in Fig. 7.

The spring motor 50, also shown in Fig. 7, is wound concurrently with the action of lever slider LS and provides the means for driving the transducer carriage 45 transversely to the right on guide bar 46, when the carriage 55 is released by the sending button SB. The spring motor 50 comprises a spiral flat spring 54 having its outer end suitably fastened to the inner wall of the sprocket wheel 99, and its outer end suitably attached to the shaft 101, which is fixedly mounted in the bracket 92; thus the spring 56 is adapted to be wound with the rotation of shaft 84, as heretofore described.

As shown in Figs. 1 and 7 the sending button SB when operated unlatches the pawl 56 from the toothed member 64, thereby causing the carriage 55 and the spring motor 50 to be released, which in turn rotates the shaft 84 counterclockwise for driving the transducer carriage 45 to the left on guide bar 46.

The right traverse of the carriage 45 is regulated in its travel on guide bar 46 to the stop 80R by means of the governor 78 shown in Figs. 2 and 3, mounted to the bracket arms 91R and 91L of the bracket 91 and suitably engaged with the shaft 84 by means of the fixed gear 79 thereon in mesh with the worm gear 78A of the governor 78.

Suitable circuitry and components are located on the rear of base 11 for performing the functions of the device of this invention, and since they form no part of the invention, they are not described in detail other than to state that the usual means is provided for connecting to the existing telephone line and for conditioning the device for operation in the usual manner by removing the handset HS from the cradle CE which operates the usual line contacts SW1, SW2, and SW3 within the switch box SW.

The circuit details of the reproducing mechanism heretofore described are shown in schematic and comprise, as shown in Fig. 17, a standard telephone and network TN, which is essentially the same as that disclosed in Patent 2,629,783 to H. F. Hopkins (Fig. 2) but modified to permit its use with this device.

This modification contemplates using the contacts 110 of the pulse relay PR shown in the reproduction circuit AMP, as a substitute for the contacts 34 of the aforementioned patent, and further contemplates using the contacts ON, shown in Fig. 17, as a substitute for the dial off-normal contacts 35 of the Hopkin's patent, thus the telephone circuit TN is conditioned to accept the generated electrical pulses of the device of this invention as it did for the pulses of the conventional rotary dial.

Shown in Fig. 2, the contacts ON are secured to the base 11 and are suitably closed when the carriage 45 is transversely moved from the stop 80R and also during its return thereto, thus causing the short circuit of the receiver REC in the circuit TN for the same known purpose used with dial pulsing.

The contact assembly 112 shown in Figs. 3 and 6 is secured to bracket 91 by screws SC4 for providing the short circuit of the transducer 44 during its traverse to the left on guide bar 46. This is accomplished by the insulated lever 110, frictionally mounted on the shaft 84, which when rotated counterclockwise moves the lever 110 from the pin 113 to the pin 114, thereby suitably positioning the lever 110 against the insulated member 115, for closing the contact members 112A of the contact assembly 112.

The reproduce circuit AMP, as shown in Fig. 17, comprises a suitable two-stage transistor amplifier comprising the transistors T1 and T2, with selective or voltage marginal regenerative feedback, a single trip multivibrator using the transistors T4 and T5, and a pulse relay PR.

It will be observed that with the amplifier as disclosed the same two transistors T1 and T2 which are used to amplify and reshape the transducer output are again used to amplify and standardize the amplitude of the pulse, thereby steepening the useful part thereof. This is accomplished by passing the voltage from the transistor T2 through the varistor V to a voltage divider set through a threshold just above the highest disturbance between pulse trains and is differentiated at the input of the transistor T3, and a small part of the output of T3 is fed back to the input of the amplifier. The multivibrator comprises the transistors T4 and T5 and serves to standardize the pulse length. This is a conventional two-transistor, single-trip multivibrator. The transistor T6 takes the output of the multivibrator to drive relay PR. The contacts 110 of the pulse relay PR are connected in series over the conductors 117 and 118, with the telephone network TN, as shown in Fig. 17, thereby serving to perform the same function which is provided by the dial pulsing contacts 34 disclosed in the Patent 2,629,783 to H. F. Hopkins (Fig. 2) for establishing a telephone connection.

*Operation—"Local" call*

In initiating a "Local" call with the device of this invention, the first action of the subscriber is to preset the called number by positioning the sliders SL in the longitudinal slots SS, so that the desired number or indicia appears in the display apertures DA, and their appropriate magnetic codes on strips CS are aligned in the transducer path L—L.

After the desired number is preset as above described, the lever slider LS is next operated in the direction indicated, and latched at the position of the finger stop FS, thereby causing the transducer 44 to be juxtapositioned with the code strips CS and also the winding of the spring 56 in motor 50, both necessary to permit the reading of the magnetic code when sending the call.

The device of this invention is now conditioned for sending the call and it is necessary for the subscriber to next remove the handset HS from its cradle CE which will then activate the line in the usual and well known manner and also impart dial tone on the line.

When the dial tone is heard by the subscriber, he is then aware that the call can be sent and proceeds next to operate the sending button SB, thereby causing the release of the lever slider LS and the spring motor 50, which in turn drives the transducer mechanism described hereinbefore; thus the magnetic code of the called number is read by the transducer 44 for translation into electrical pulses, which are then amplified and conditioned into suitable pulses by the reproduce circuit AMP, shown in Fig. 17, and sent over the line in the usual well known manner to establish a connection with the called party, thereby completing the initiated call.

*Operation—"National Area" call*

In initiating a "National Area" call with the device of this invention, the first action of the subscriber is to lift the hinged door 16 in an upright position, thereby uncovering the display apertures DA1 and conditioning the device for sending the area code, as described heretofore.

The device so conditioned permits the subscriber to preset the area and local numbers of the called party by positioning the sliders SL—SL1 in their respective slots SS—SS1, so that the combined number of the called party is displayed in the apertures DA—DA1, and their appropriate magnetic codes on strips CS are aligned in the transducer path L—L.

After the desired number is preset as described above, the subscriber then proceeds to send the call, using the same means and procedures, as described hereinbefore for a "Local" call.

*Operation—"Service" call*

In initiating a "Service" call with the device of this invention, the subscriber first selects the desired service by positioning the slider 30 in the longitudinal slot 40 to the service designated on the casing 10, so that the appropriate magnetic code on drum DR is aligned in the transducer path L—L and the device conditioned to send only the code of the selected "Service" call.

After the desired "Service" call is selected as described above, the subscriber can then proceed to send the call by using the same means and procedures as described hereinbefore for "Local" and "Area" calls.

In the event that the subscriber encounters a busy line signal in any of the calls selected as described above, the particular call may be repeated after a lapse of time without the necessity of presetting the called number.

It is to be understood that the above-described arrangements are illustrative of the application of the principles of the invention. Numerous other arrangements may be devised by those skilled in the art without departing from the spirit and scope of the invention.

What is claimed is:

1. A telephone call transmitter comprising a plurality of linear, parallel, non-magnetic strips, each of said strips having thereon a series of groups of magnetic elements, each of said groups corresponding to a respective numeral and said series of groups being spaced longitudinally of the respective strip, means for displacing each of said strips lengthwise to place any selected section thereof adjacent a reference axis, a magnetic detecting element, and means for sweeping said detecting element along said axis and over the sections adjacent thereto.

2. In a code signal transmitter comprising a plurality of linear, parallel, non-magnetic strips each of said strips having thereon a series of groups of magnetic markings, each of said groups corresponding to a respective numeral and said series of groups being spaced longitudinally on the respective strip, means for displacing each of said strips lengthwise to place any selected section thereof adjacent a reference axis, a magnetic detecting element, and means for sweeping said detecting element transversely along said axis and over the said sections adjacent thereto.

3. An impulse transmitting mechanism which comprises a plurality of flexible strips of non-magnetic material having deposited thereon magnetic material in the form of markings spaced longitudinally and arranged transversely in groups, each said group constituting a code corresponding to respective indicia, said indicia being marked longitudinally on said strips in spaced relation, means for displacing said strips longitudinally so that the desired indicia is displayed and the code corresponding thereto is aligned adjacent a transducer path, a magnetic transducer, and means for moving said transducer transversely along said path for translating the aligned code, and a separate means for permitting the translation of said code only in one transverse direction of said transducer.

4. An impulse transmitting mechanism comprising a plurality of flexible non-magnetic strips having recorded thereon magnetic markings, said markings being arranged in series of groups spaced longitudinally and transversely on said strips, said groups of markings constituting a magnetic code corresponding to preassigned indicia contained thereon, means for displacing said strips longitudinally so that each said indicium is effectively displayed for selection, and said magnetic code corresponding thereto is effectively aligned adjacent a reference axis, a magnetic transducer, means for moving said transducer transversely along said axis, and a separate means responsive to the longitudinal movement of a particular strip to prevent any cooperative relationship between the transducer and remaining strips for translating the magnetic code thereon into electrical impulses.

5. An impulse transmitting mechanism comprising a plurality of flexible non-magnetic strips having recorded thereon magnetic markings arranged in series of groups spaced longitudinally on said strips, said magnetic markings characterizing a single or multidigit code corresponding to preassigned indicia contained on said strips, means for displacing said strips longitudinally so that a selected code is effectively aligned adjacent a reference axis and the corresponding indicium effectively displayed, a magnetic reading head, means for moving said magnetic head transversely along the said axis for translating the said code into electrical impulses, a separate automatic means for preventing the cooperative relationship between the said magnetic head and particular groups of codes, and means preventing the display of indicia pertinent to said codes.

6. A telephone call transmitter comprising a plurality of parallel non-magnetic members each having thereon a plurality of sections spaced longitudinally thereof, each section having thereon magnetic elements coded to correspond to preassigned indicia, means for displacing each of said strips longitudinally to place any prescribed section thereon adjacent a transverse reference axis, a magnetic pick-up head, means for moving said head across said axis to sweep along the sections thereadjacent, and means, not under the control of the subscriber, for transmitting automatically, the code of the calling station after the preselected called station code has been transmitted.

7. A telephone call transmitter comprising a plurality of linear, parallel, non-magnetic strips, each of said strips having thereon a series of groups of magnetic elements, each of said groups corresponding to a respective numeral and said series of groups being spaced longitudinally of the respective strip, means for displacing each of said strips lengthwise to place any selected section thereof adjacent a reference axis for preselecting a desired called station code, a magnetic detecting element, means for sweeping said detecting element along said axis and over the sections adjacent thereto, and means, not under the control of the subscriber, for transmitting automatically, the code of the calling station after the preselected called station code has been transmitted.

References Cited in the file of this patent

UNITED STATES PATENTS

| | | |
|---|---|---|
| 2,191,913 | Lewis | Feb. 27, 1940 |
| 2,395,539 | Dowey | Feb. 26, 1946 |
| 2,620,389 | Potter | Dec. 2, 1952 |
| 2,685,409 | English | Aug. 3, 1954 |